(12) United States Patent  
Schmitt

(10) Patent No.: US 8,343,338 B2
(45) Date of Patent: Jan. 1, 2013

(54) REVERSE OSMOSIS WATER FILTERING SYSTEM

(75) Inventor: Craig A. Schmitt, Phoenix, AZ (US)

(73) Assignee: Watts Water Technologies, Inc., North Andover, MA (US)

( * ) Notice: Subject to any disclaimer, the term of this patent is extended or adjusted under 35 U.S.C. 154(b) by 541 days.

(21) Appl. No.: 12/576,553

(22) Filed: Oct. 9, 2009

(65) Prior Publication Data

US 2010/0116724 A1  May 13, 2010

Related U.S. Application Data

(60) Provisional application No. 61/195,685, filed on Oct. 9, 2008.

(51) Int. Cl.
*B01D 61/10* (2006.01)

(52) U.S. Cl. ............ 210/134; 137/625.17; 137/637; 137/801; 137/594; 137/597; 210/136; 210/248; 210/257.2; 210/321.6; 210/449

(58) Field of Classification Search .......... 210/134, 210/136, 137, 141, 194, 195.1, 195.2, 257.2, 210/321.6, 321.65, 321.72, 248, 449, 637, 210/652, 424; 137/597, 637, 637.05, 637.2, 137/594, 625.17, 801; 251/324
See application file for complete search history.

(56) References Cited

U.S. PATENT DOCUMENTS

| | | | | |
|---|---|---|---|---|
| 2,158,342 A | * | 5/1939 | Trader et al. | 137/637.4 |
| 2,564,066 A | * | 8/1951 | Jordan | 137/625.29 |
| 3,115,066 A | * | 12/1963 | Firth et al. | 91/250 |
| 3,192,952 A | * | 7/1965 | Botnick | 137/607 |
| 3,507,475 A | * | 4/1970 | Davis et al. | 251/120 |
| 4,176,063 A | | 11/1979 | Tyler | |
| 4,604,194 A | | 8/1986 | Entingh | |
| 4,705,625 A | | 11/1987 | Hart, Jr. | |
| 4,768,553 A | * | 9/1988 | Marx | 137/625.17 |
| 4,791,962 A | * | 12/1988 | Moen | 137/625.17 |
| 4,808,302 A | | 2/1989 | Beall, Jr. | |
| 4,830,744 A | | 5/1989 | Burrows | |
| 4,853,117 A | | 8/1989 | Burrows | |
| 4,876,002 A | * | 10/1989 | Marshall et al. | 210/136 |
| 4,885,085 A | | 12/1989 | Beall, Jr. | |
| 4,895,654 A | | 1/1990 | Burrows | |
| 5,057,214 A | * | 10/1991 | Morris | 210/136 |
| 5,132,017 A | | 7/1992 | Birdsong et al. | |
| 5,660,720 A | * | 8/1997 | Walling | 210/85 |
| 5,662,793 A | | 9/1997 | Beall, Jr. | |
| 5,991,884 A | | 11/1999 | Lin et al. | |
| 6,110,360 A | | 8/2000 | Hart, Jr. | |

(Continued)

*Primary Examiner* — Joseph Drodge
(74) *Attorney, Agent, or Firm* — Edwards Wildman Palmer LLP; David J. Silvia; George N. Chaclas

(57) ABSTRACT

A valve assembly having a first valve defining an inlet connected to the inlet supply and an outlet connected to the concentrate chamber, a second valve defining an inlet connected to the permeate chamber and an outlet connected to the faucet, and a third valve defining an outlet connected to drain, a port connected to the concentrate chamber, and an inlet connected to the inlet supply. The port is selectively in fluid communication with the third valve outlet and inlet. When the faucet opens, the first valve opens, the second valve has permeate flowing, and the third valve opens a flowpath between the third valve port and the inlet due to pressure dropping in the second valve. When the faucet closes, the first valve closes and the third valve opens another flowpath between the third valve port and outlet due to pressure created in the second valve.

19 Claims, 10 Drawing Sheets

U.S. PATENT DOCUMENTS

| | | | | |
|---|---|---|---|---|
| 6,136,196 A * | 10/2000 | Weinberger | | 210/650 |
| 6,764,595 B1 | 7/2004 | Halemba et al. | | |
| 7,285,210 B2 | 10/2007 | Schmitt | | |
| 7,353,838 B2 | 4/2008 | Schmitt et al. | | |
| 2001/0004442 A1 | 6/2001 | Elliott-Moore | | |
| 2004/0164022 A1 | 8/2004 | Solomon | | |

* cited by examiner

REVERSE OSMOSIS WATER FILTERING SYSTEM

CROSS-REFERENCE TO RELATED APPLICATION

This application claims priority to U.S. Provisional Patent Application No. 61/195,685, filed Oct. 9, 2008, which is incorporated herein by reference. This application is also related to U.S. Pat. No. 7,550,084 issued on Jun. 23, 2009, which claims priority to U.S. Provisional Patent Application No. 60/746,242, filed May 2, 2006, each of which is incorporated herein by reference.

TECHNICAL FIELD OF THE DISCLOSURE

The present disclosure relates to new and improved reverse osmosis filtering systems and, more particularly, to water-on-water valves for use in reverse osmosis water filtering systems.

BACKGROUND OF THE DISCLOSURE

As is known, a reverse osmosis (RO) water filtering process uses a semi-permeable membrane that has the ability to remove and reject a wide spectrum of impurities and contaminants from water using only water pressure. These contaminants are automatically rinsed down the drain. The purified water is then stored in a tank for dispensing through an auxiliary faucet.

A typical residential RO water filtering system is installed under a kitchen sink and includes a filter assembly, a reverse osmosis membrane, a storage tank, and an auxiliary faucet attached to the sink. The filter assembly includes a sediment filter and a carbon filter. Intake water enters the system from a cold-water source and is routed through the filter system. The sediment filter removes sediment such as sand and dirt and the like from the intake water, while the carbon filter removes chlorine and other contaminants. The filtered water is then routed to the RO membrane.

The RO membrane includes three ports: an intake port, a permeate outlet port, and a concentrate outlet port. The intake port receives filtered intake water from the filter assembly, and permeate passes through the membrane to the permeate outlet port, while the concentrate water does not pass through the membrane but is directed to the concentrate outlet port. Concentrate water is routed from the concentrate outlet port through a flow restrictor for disposal down a drain.

Most plumbing codes specify that an anti-siphon or air gap must be located between the concentrate outlet port and the drain. This prevents development of a vacuum in the system that could cause drain or wastewater to be siphoned back into the RO system and contaminate the water supply connected to the RO system. The auxiliary faucet, normally also includes an air gap connecting the concentrate outlet port and the drain.

The permeate is routed from the permeate outlet port to the tank to be stored under pressure. An automatic shut-off valve stops the flow of water to the membrane, drain and to the tank when the tank is full. When the auxiliary faucet is opened by a user, permeate is forced from the tank, through a carbon filter, and out the faucet.

In a typical RO system, especially in the type of RO system used in homes, the rate at which treated water or "permeate" is produced by the system can be very low. As a result, the storage tank is used to store permeate, so that relatively large quantities can be made available when the consumer opens the tap or faucet. In the past, "pre-charged" storage tanks were used. In this type of storage tank, a bladder is used to define a pressurized chamber, usually filled with a compressible gas, such as ambient air. The bladder isolates the gas from the permeate received by the tank. As the permeate is received by the tank, the permeate gradually compresses the gas in the pressurized chamber. As a result, the permeate is stored under pressure, such that when the tank is opened, the pressure in the storage tank exerted by the compressed gas, forces permeate out of the tank to the faucet.

Although these storage tanks are widely used and provide a suitable means for storing permeate, the storage tanks do have a significant drawback. As more and more permeate is received by the tank, the pressure needed to effect flow of permeate into the tank increases because as the gas chamber is compressed, forces on the bladder increase and the backpressure in the system increases. Accordingly, in order to completely fill the storage tank, a significant amount of time and concentrate water are consumed as the capacity of the tank is reached. This pressure increase reduces the efficiency and effectiveness of the RO membrane.

This resistance to flow exerted by the storage tank decreases the production rate of the RO system, since the RO system relies on differential pressures between the source and the output to effect flow across the membrane. In addition, as permeate is discharged by the storage tank, the permeate delivery pressure is gradually reduced as the pressurized gas chamber expands. This reduced delivery pressure is observable at the auxiliary faucet. Further examples of prior art systems are shown in U.S. Pat. Nos. 6,764,595; 6,110,360; 5,132,017; 4,853,117; and 4,705,625, each of which is incorporated herein by reference in its entirety.

What is still desired is a new and improved RO water filtering system. Preferably, the RO water filtering system will include an improved permeate storage arrangement that reduces backpressure within the system and/or provides a steadier pressure at the faucet.

SUMMARY OF THE DISCLOSURE

The present disclosure provides a new and improved RO water filtering system. Among other aspects and advantages, the RO water filtering system of the present disclosure includes an improved permeate storage arrangement that reduces backpressure within the system. The storage arrangement is adapted to pressurize permeate in a storage tank using concentrate water. In one embodiment, the permeate is pushed out of the storage tank only when the permeate or auxiliary faucet assembly is open.

The present disclosure also provides an auxiliary faucet assembly for use as part of the RO water filtering system. The auxiliary faucet assembly is adapted so that the flow of concentrate water into the storage tank is synchronized with the flow of permeate out of the storage tank. Preferably, the RO water filtering system utilizes off the shelf components whenever possible to allow for easy, cost-effective manufacture and assembly.

One embodiment of the subject technology is directed to a reverse osmosis liquid filtering assembly including a reverse osmosis membrane for receiving intake liquid and creating permeate and concentrate liquid and a tank having a first chamber for storing the permeate and a second chamber for receiving the concentrate liquid, the first and second chambers being operatively connected so that the concentrate liquid in the second chamber pressurizes the permeate in the first chamber. The embodiment may further include means for directing the concentrate liquid into the second chamber, wherein the means selectively directs the concentrate liquid into the second chamber only when the faucet is open. To relieve backpressure, a connection between the second chamber and drain may be provided.

Another embodiment is directed to a method of filtering a liquid comprising the steps of using reverse osmosis on the liquid to create a permeate flow and a concentrate flow, storing the permeate flow in a chamber formed in a tank, selectively dispensing the permeate flow from the tank and when the permeate flow is dispensed, directing the concentrate flow into a portion of the tank to facilitate dispensing the permeate flow. The permeate can be dispensed from a mechanism such as a faucet assembly, an ice-maker assembly and a combination thereof. Backpressure in the tank may be reduced by connecting the portion to drain.

In still another embodiment, the subject technology is a liquid filtering assembly including a reverse osmosis membrane for receiving intake liquid and creating permeate and concentrate liquid and a tank. The tank has a chamber for storing the permeate for selective dispensing and a portion for receiving the concentrate liquid, the portion being operatively connected so that the concentrate liquid passes to drain to relieve a backpressure on the reverse osmosis filter when the permeate is not being dispensed. The concentrate liquid in the portion may pressurize the permeate in the first chamber when the permeate is being dispensed.

A further embodiment is a liquid filtering assembly including a cleaning assembly for receiving intake liquid and creating a clean flow and a reject flow and a tank having a chamber for storing the clean flow and a portion for receiving a secondary flow, the chamber and portion being operatively connected so that the secondary flow in the portion pressurizes the clean flow in the chamber, wherein the secondary flow is selected from the group consisting of the intake liquid, reject flow and combinations thereof.

In one embodiment, the subject technology is directed to a reverse osmosis liquid filtering assembly including an inlet supply, a reverse osmosis membrane for receiving the inlet supply and creating permeate and concentrate, and a tank connected to the reverse osmosis membrane for storing the permeate in a permeate chamber and the concentrate in a concentrate chamber. A faucet dispenses the permeate above a drain for disposal of waste. The filtering assembly includes a valve assembly having three sub-assembly valves. The first sub-assembly valve defines an inlet connected to the inlet supply and an outlet connected to the concentrate chamber. The second sub-assembly valve defines an inlet connected to the permeate chamber and an outlet connected to the faucet. The third sub-assembly valve defines an outlet connected to drain, an inlet connected to the inlet supply, and a port connected to the concentrate chamber, wherein the port is selectively in fluid communication with the third sub-assembly outlet and inlet.

When the faucet is closed, the first sub-assembly valve is closed at least in part due to pressure created in the second sub-assembly valve, the second sub-assembly valve has no flow, and the third sub-assembly valve is set to open a first flowpath between the third sub-assembly port and outlet at least in part due to pressure created in the second sub-assembly valve. When the faucet is open, the first sub-assembly valve is opened at least in part due to pressure dropping in the second sub-assembly valve, the second sub-assembly valve has the permeate flowing there through, and the third sub-assembly valve is set to open a second flowpath between the third sub-assembly port and the inlet at least in part due to pressure dropping in the second sub-assembly valve. The liquid filtering assembly may also work such that upon closing the faucet after dispensing an amount of permeate, the pressure rebuilds in the second sub-assembly valve gradually such that the first sub-assembly valve remains open until the permeate chamber is substantially full.

One embodiment further comprises a piston assembly within the first sub-assembly valve and a rolling diaphragm coupled to the piston assembly intermediate the first sub-assembly valve and second sub-assembly valve and/or a check valve in the second sub-assembly to prevent backflow from the second sub-assembly outlet.

Still another embodiment further comprises a piston assembly within the third sub-assembly valve. The piston assembly includes a piston seal coupled to a piston rod. A first seal ring mounts in a first recess on an end of the piston seal such that the first seal ring only contacts a first sealing surface to selectively close the first flowpath. A second seal ring mounts in a second recess on the piston seal such that the second seal ring only contacts a second sealing surface to selectively close the second flowpath. An annular stop on the piston seal may form the second recess. Alternatively, the second recess is an annular groove that sealingly enters a tubular channel formed by the third sub-assembly valve to close the second flowpath. The piston seal may have a central tapered portion.

In another embodiment, the subject technology is directed to a valve assembly including a first valve defining an inlet connected to an inlet supply and an outlet connected to a concentrate chamber, a second valve defining an inlet connected to a permeate chamber and an outlet connected to a faucet, and a third valve defining an outlet connected to drain, a port connected to the concentrate chamber, and an inlet connected to the inlet supply, the port being selectively in fluid communication with the third valve outlet and inlet. When the faucet opens, the first valve opens, the second valve has permeate flowing, and the third valve opens a flowpath between the third valve port and the inlet due to pressure dropping in the second valve. When the faucet closes, the first valve closes and the third valve opens another flowpath between the third valve port and outlet due to pressure created in the second valve.

Additional aspects and advantages of the present disclosure will become readily apparent to those skilled in this art from the following detailed description, wherein exemplary embodiments of the present disclosure are shown and described, simply by way of illustration of the best modes contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figure 1:
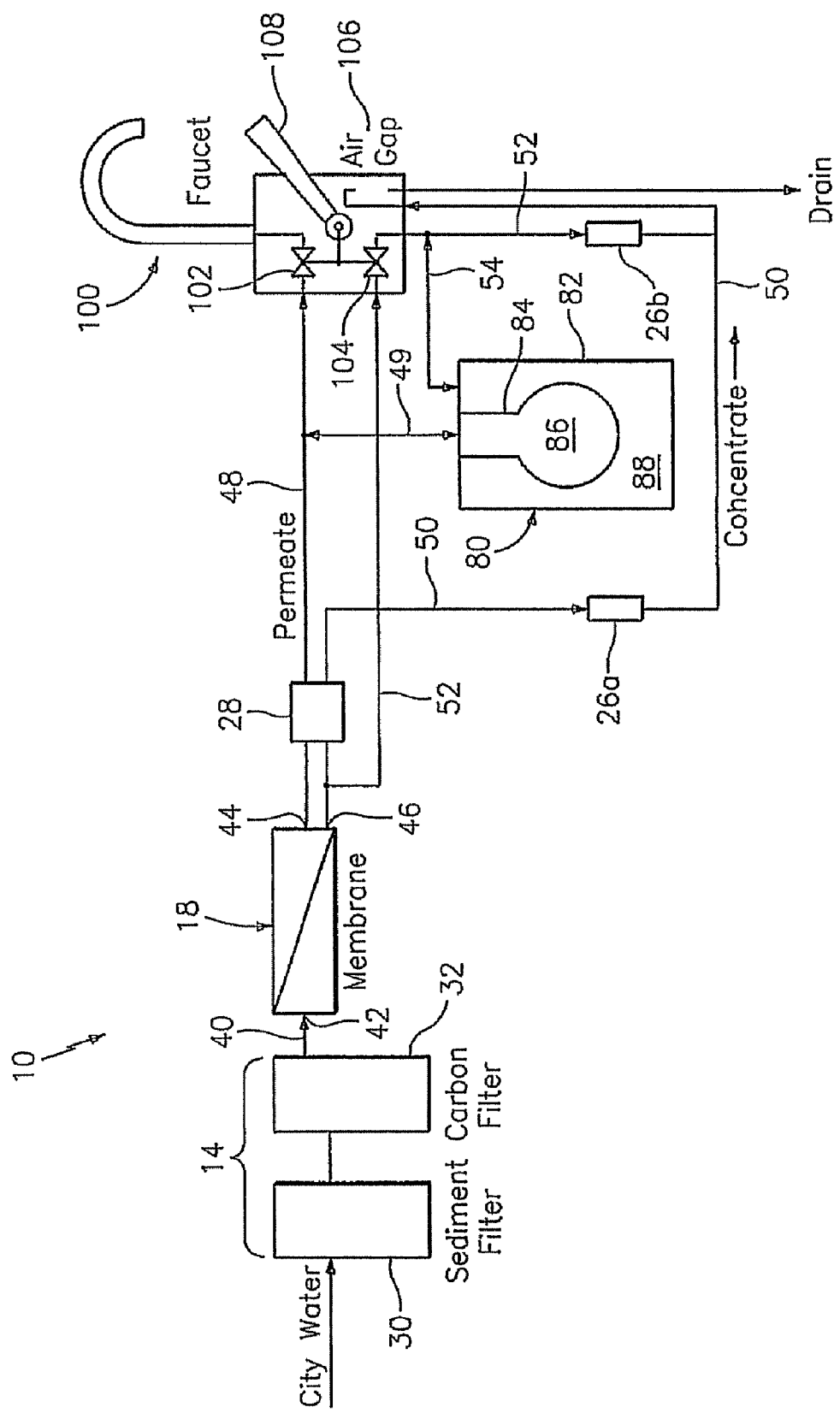
FIG. 1 is a schematic drawing that shows an exemplary embodiment of a new and improved RO water filtering system constructed in accordance with the present disclosure.

The present invention overcomes many of the prior art problems associated with reverse osmosis (RO) filtering systems. The advantages, and other features of the RO filtering systems disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Additionally, the illustrated and described embodiments can be understood as providing, exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed systems or methods. Further, the shapes and sizes of components are also somewhat schematic for exemplary purposes and can be altered without materially affecting or limiting the disclosed technology.

For clarity, common items such as conduits, tubing interconnections and interconnections have not been specifically included, represented schematically in the Figures or shown and not described in any detail as would be appreciated by those of ordinary skill in the pertinent art. All relative descriptions herein such as left, right, up, and down are with reference to the Figures, and not meant in a limiting sense.

FIG. 1 shows an exemplary embodiment of a new and improved RO water filtering system 10 constructed in accordance with the present disclosure. Intake water enters the filtering system 10 from a water source, such as city water, and is routed there through. The RO water filtering system 10 generates purified water or permeate for dispensing from a faucet assembly 100 and waste or concentrate water that is ultimately rejected to drain.

In brief overview, the system 10 includes a filter assembly 14 for initially removing sediment and contaminants. The filter assembly 14 can include a sediment filter 30 and a carbon filter 32. After passing through the filter assembly 14, the filtered water passes a RO membrane 18 that creates permeate and concentrate water. A storage tank 80 accumulates the permeate while using the concentrate water to selectively create pressure upon the stored permeate. The RO water filtering system 10 also includes an auxiliary faucet assembly 100 that works with flow restrictors 26a and 26b and a shut-off valve 28 to control the output of the RO water filtering system 10. Flow restrictor 26b an off the shelf component that allows using a majority of off the shelf components in the system 10 with the exception of the faucet as would be recognized after review of the discussion below.

The storage tank 80 includes an outer container 82 housing an expandable resilient bladder 84. The expandable bladder 84 forms a permeate storage chamber 86, while a concentrate water chamber 88 is formed between the bladder 84 and the outer container 82. Because the bladder 84 is flexible and expands, pressure equalizes within the tank 80 generally. Thus, higher pressure in the concentrate chamber 88 will urge permeate from the storage chamber 86 and lower pressure in the concentrate chamber 88 reduces and/or removes resistance on permeate into the permeate storage chamber 86. In one embodiment, the bladder 84 is fabricated from an elastomeric material.

The RO membrane 18 includes three ports: an intake port 42, a permeate outlet port 44, and a concentrate outlet port 46. The intake port 42 receives filtered intake water from the filter assembly 14 through a water tube 40. The permeate is routed from the outlet port 44 through the shut-off valve 28 and permeate tube 48 and to a first valve 102 of the faucet assembly 100. The permeate is also diverted through a permeate diverter tube 49 to the permeate storage chamber 86 of the storage tank 80 to be stored under pressure until the valve 102 of the faucet assembly 100 is opened.

When the valve 102 is opened by a user, permeate is forced from the tank 80 and out the faucet assembly 100. The combination of intake pressure differential and pressure from the concentrate water contained in the concentrate water chamber 88 provides excellent outflow of permeate.

Concentrate water is routed from the outlet port 46 through the shut-off valve 28 and a primary concentrate tube 50, and then through an air gap 106 of the faucet for subsequent disposal down drain 110. One of the flow restrictors 26a is provided in the primary concentrate tube 50.

The shut-off valve 28 is automatic and is adapted to stop the flow of concentrate water through to the primary concentrate tube 50 when the permeate storage chamber 86 of the tank 80 becomes full of permeate and pressure within the permeate tube 48 rises past a predetermined level indicating that the permeate storage chamber 86 is full. The blocked primary concentrate tube 50 prevents additional filtered water from entering the intake port 42 of the RO membrane and prevents the production of additional permeate.

A secondary concentrate tube 52 branches off from the primary concentrate tube 50 between the RO membrane 18 and the shut-off switch 28. The secondary concentrate tube 52 is routed through a second valve 104 of the faucet assembly 100 and connects back to the primary concentrate tube 50 between the first flow restrictor 26a and the air gap 106 of the faucet assembly 100. The other of the flow restrictors 26a is provided in the secondary concentrate tube 52.

A concentrate diverter tube 54 connects the concentrate water chamber 88 of the tank 80 to the secondary concentrate tube 52 between the second valve 104 and the second flow restrictor 26b. The valves 28, 102, 104 may be any kind of valve now known and later developed such a diaphragm, a pin valve, a ball valve, a gate valve, a globe valve, or a butterfly valve. Although not shown explicitly, the branching of the various tubes could be by several means such as diverters or T-shaped fittings.

The faucet assembly 100 includes a lever 108 that controls both of the first and second valves 102, 104 of the faucet assembly 100, such that the valves 102, 104 are substantially simultaneously opened and closed. During operation with the valves 102, 104 closed, the RO water filtering system 10 operates until the permeate storage chamber 86 is full and the shut-off switch 28 closes the primary concentrate tube 50. At this point, the permeate storage chamber 86 is at its largest volume while the concentrate chamber 88 of the tank 80 is at its smallest volume, with excess concentrate water being expelled from the concentrate chamber 88, through the second flow restrictor 26b and the air gap 106, and down the drain. Throughout the expansion of the permeate storage chamber 86, backpressure advantageously remains low while the efficiency of the RO membrane remains high because of the expulsion of the concentrate water from the concentrate chamber 88.

When the lever 108 of the faucet assembly 100 is opened, both valves 102, 104 are opened. Permeate is directed from the permeate storage chamber 86 to the faucet assembly 100 by the open first valve 102, while concentrate water is directed through tubes 52, 54 to the concentrate chamber 88 by the open second valve 104. The concentrate water flowing into the concentrate chamber 88 provides additional pressure for expelling the permeate from the permeate storage chamber 86. As a result, the exit flow from the faucet assembly 100 is adequately maintained as the permeate storage chamber 86 empties.

Figure 2:
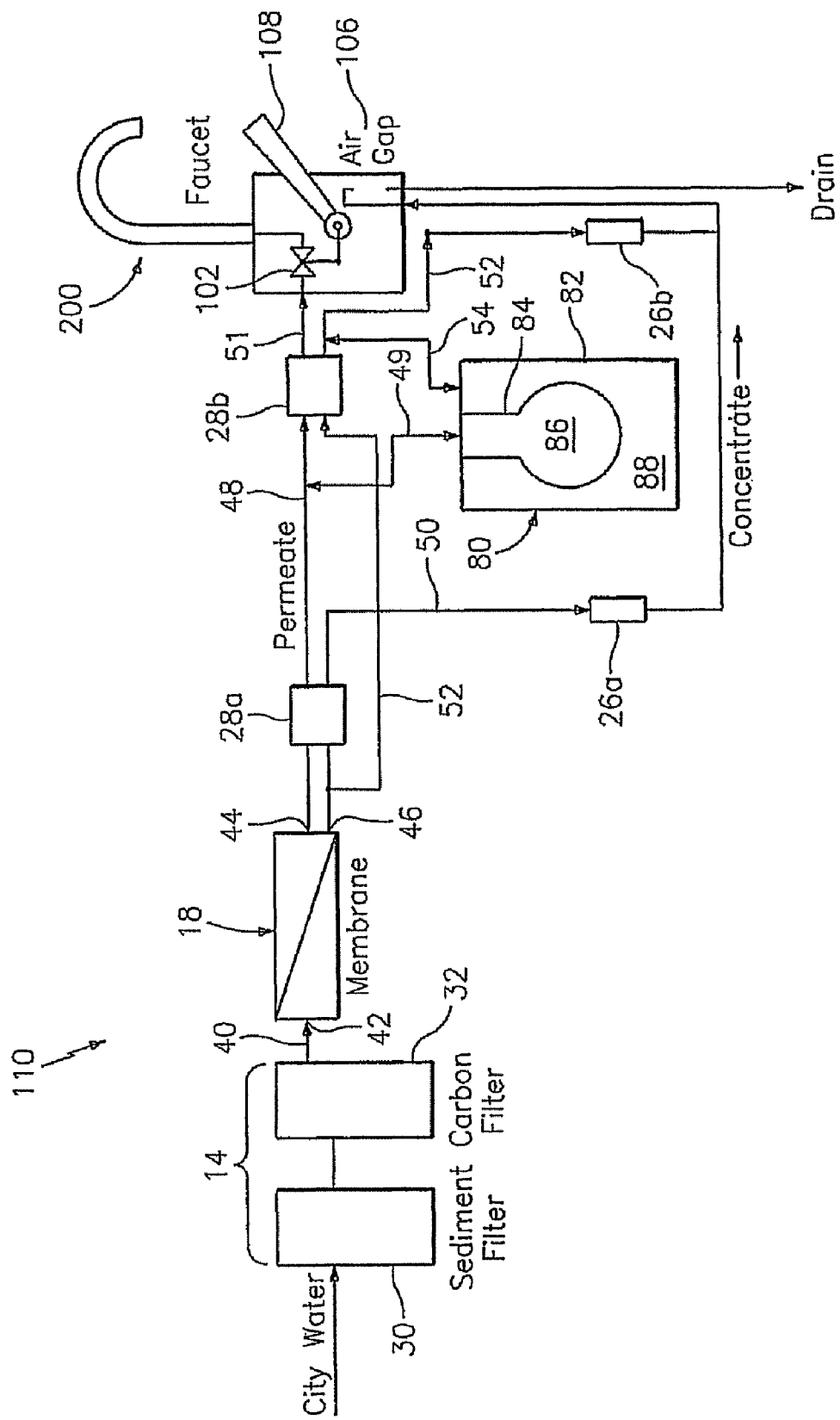
FIG. 2 is a schematic drawing that shows another exemplary embodiment of a new and improved RO water filtering system constructed in accordance with the present disclosure.

FIG. 2 shows another exemplary embodiment of a new and improved RO water filtering system 110 constructed in accordance with the present disclosure. The embodiment 110 of FIG. 2 is similar to the embodiment 10 of FIG. 1 such that similar elements have the same reference number. The filtering system 110 uses concentrate to provide pressure, thus similar to above, water is not wasted as compared to systems that use intake water to pressurize. Further, the filtering system 110 desirably uses standard components like diaphragm valves and flow restrictors to accomplish the objectives.

A primary difference of the water filtering system 110 is the use of two shut-off valves 28a and 28b with a modified auxiliary faucet assembly 200. The faucet assembly 200 includes only one valve 102 for controlling flow of the permeate. Accordingly, when the lever 108 is actuated to dispense permeate, the permeate in the tank 80 is urged out of the faucet assembly 200. It is envisioned that the faucet assembly 200 could be any device for using or dispensing purified water such as an ice-maker or other application. Commonly, the faucet assembly 200 and ice-maker would both receive permeate from the system 110.

As shown, the second shut-off valve 28b is connected in the permeate path between the RO membrane 18 and faucet assembly 200. Tubing 51 connects the permeate output of the shut-off valve 28b to the faucet valve 102. In the concentrate path, the second shut-off valve 28b is connected between the RO membrane 18 and the concentrate chamber 88 with the secondary concentrate tube 52 passing to drain and having a concentrate diverter tube 54 branch to bring the concentrate to the concentrate chamber 88 of the tank 80. Shut-off valves 28a, 28b may be the exact same part. In a preferred embodiment, the shut-off valves 28a, 28b close upon the exit pressure being two thirds of the inlet pressure.

In operation, the shut-off valve 28b responds to pressure changes. When the lever 108 opens, the pressure drops in tubing 51 to open the shut-off valve 28b to allow permeate and concentrate water to flow there through. As a result, concentrate water flows into the concentrate chamber 88 via the diverter tube 54 to urge the permeate water in the permeate storage chamber 86 into diverter tube 49 and ultimately out the faucet 200. For the time that the faucet is open, the flow restrictor 26b also creates some bleeding to drain, but the flow restrictor 26b is sized so that the bleed level is acceptable.

Upon closing the lever 108, the pressure builds in tubing 51 so that the shut-off valve 28b closes. With the shut-off valve 28b closed, the permeate passes into the permeate storage chamber 86. The concentrate chamber 88 is still open to drain via tubing 52, 54. The flow restrictor 26b drains more quickly than the RO membrane 18 makes permeate so that the system back pressure is minimal, if any, and the efficiency of the RO membrane 18 is improved. As a result of the minimal back pressure, the permeate not only replenishes quickly without resistance, a fast wash effect occurs at the RO membrane 18. In other words, the increased flow across the RO membrane has a cleaning effect.

Figure 3:
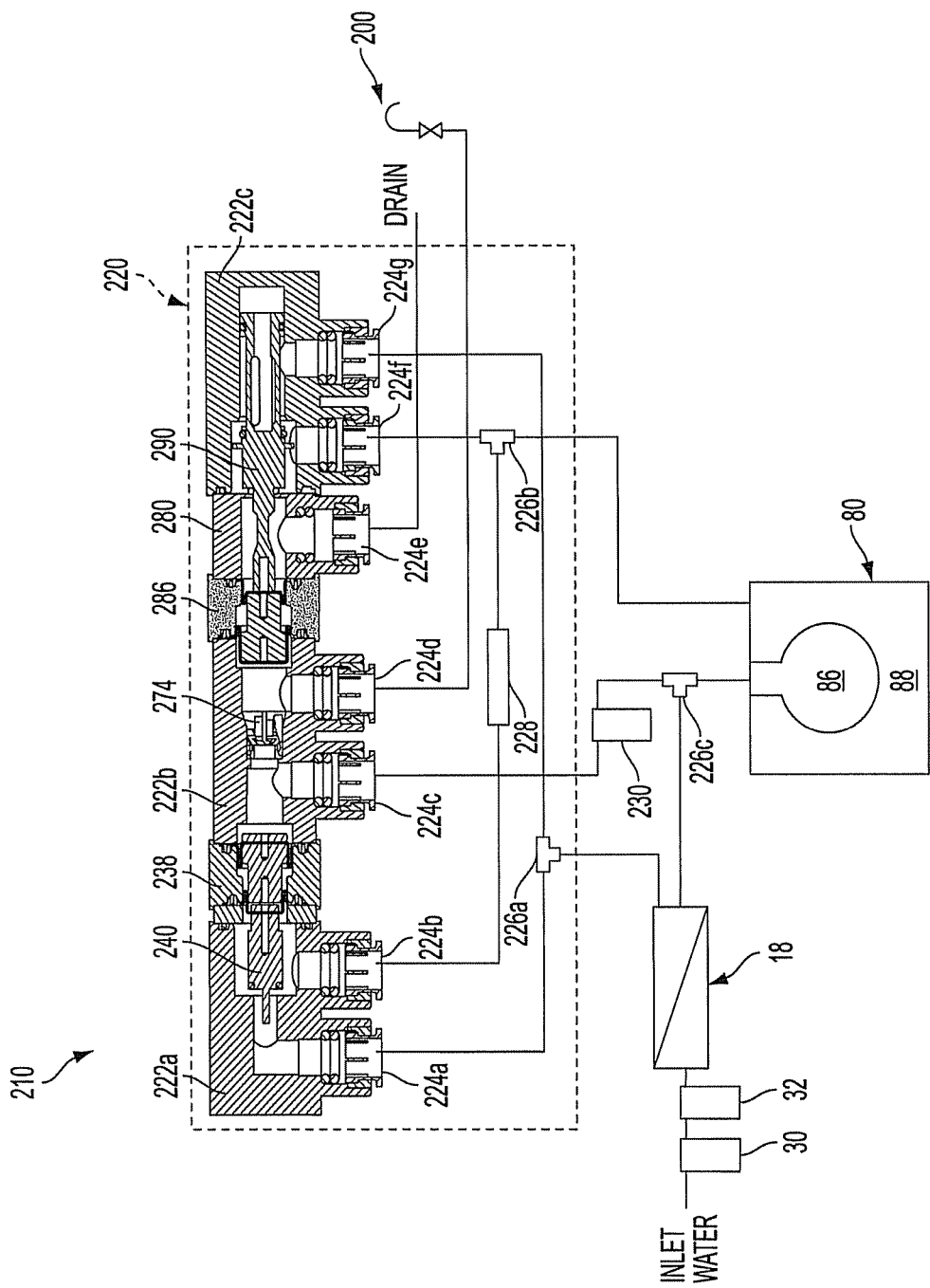
FIG. 3 is a schematic drawing that shows still another exemplary embodiment of a new and improved RO water filtering system constructed in accordance with the present disclosure.

Referring now to FIG. 3, another exemplary embodiment of a new and improved RO water filtering system 210 constructed in accordance with the present disclosure is shown. The RO water filtering system 210 is similar to the embodiments 10, 110 of FIGS. 1 and 2 such that similar elements have the same reference number. The filtering system 210 takes advantage of a new valve assembly 220, which controls four flow paths.

In brief overview, the valve assembly 220 includes three sub-assembly valves 222a-c. A first sub-assembly valve 222a defines an inlet 224a connected to the inlet supply and an outlet 224b connected to the concentrate chamber 88. A second sub-assembly valve 222b defines an inlet 224c connected to the permeate chamber 86 and an outlet 224d connected to the faucet 200. A third sub-assembly valve 222c defines an outlet 224e connected to drain, a port 224f connected to the concentrate chamber 86, and an inlet 224g connected to the inlet supply. The port 224f is selectively in fluid communication with the third sub-assembly outlet 224e and inlet 224g.

When the faucet is open, the first sub-assembly valve 222a opens to create a first flowpath A at least in part due to pressure dropping in the second sub-assembly valve 222b, the second sub-assembly valve 222b opens a second flowpath B with the permeate flowing there through, and the third sub-assembly valve 222c is opens a third flowpath C between the third sub-assembly port 224f and the inlet 224g at least in part due to pressure dropping in the second sub-assembly valve 222b.

When the faucet is closed, the first sub-assembly valve 222a is closed at least in part due to pressure created in the second sub-assembly valve 222b, the second sub-assembly valve 222b has no flow, and the third sub-assembly valve 222c is set to open a fourth flowpath D between the third sub-assembly port 224f and outlet 224e at least in part due to pressure created in the second sub-assembly valve 222b. It is noted that several interconnections such as tubing function to complete more than one flowpath A, B, C or D as noted in the Figures.

Figure 4:
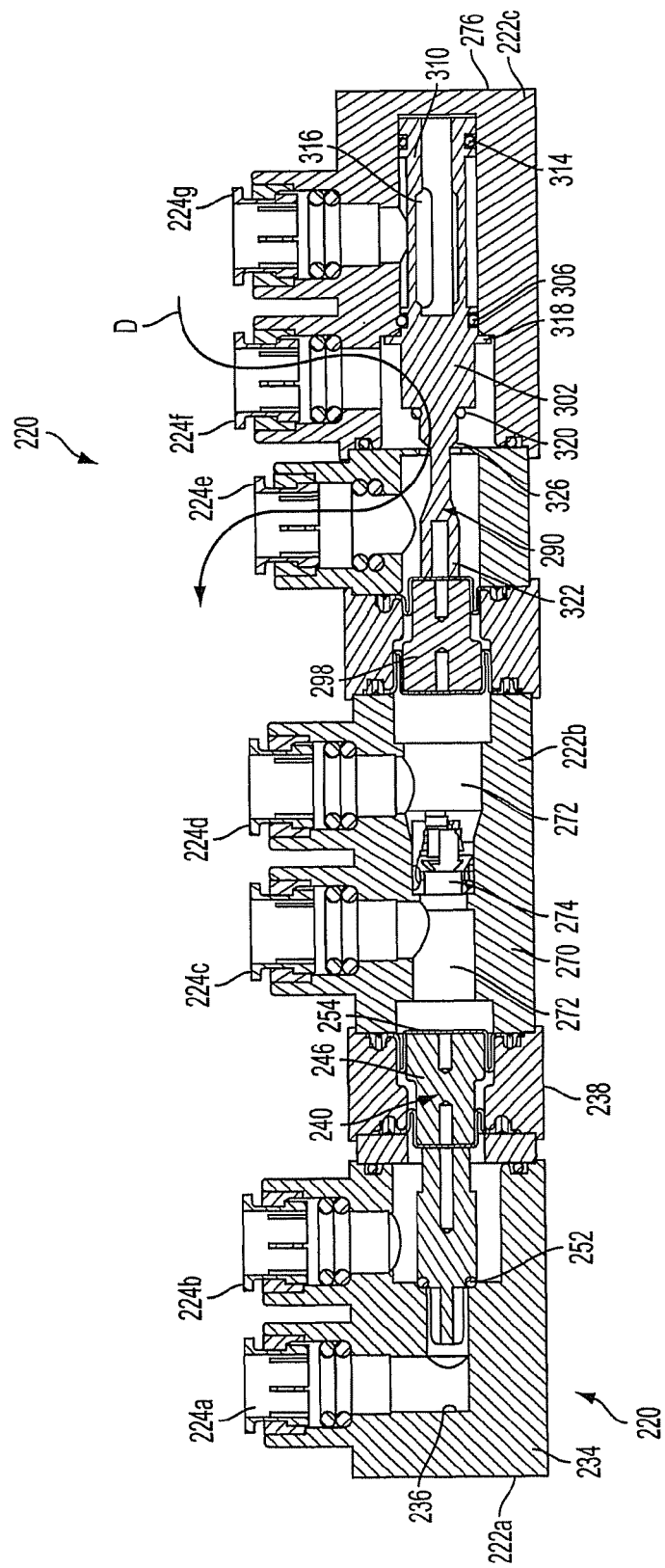
FIG. 4 is an isolated cross-sectional views of the valve assembly of FIG. 3 shown in the faucet closed position.
Figure 5:
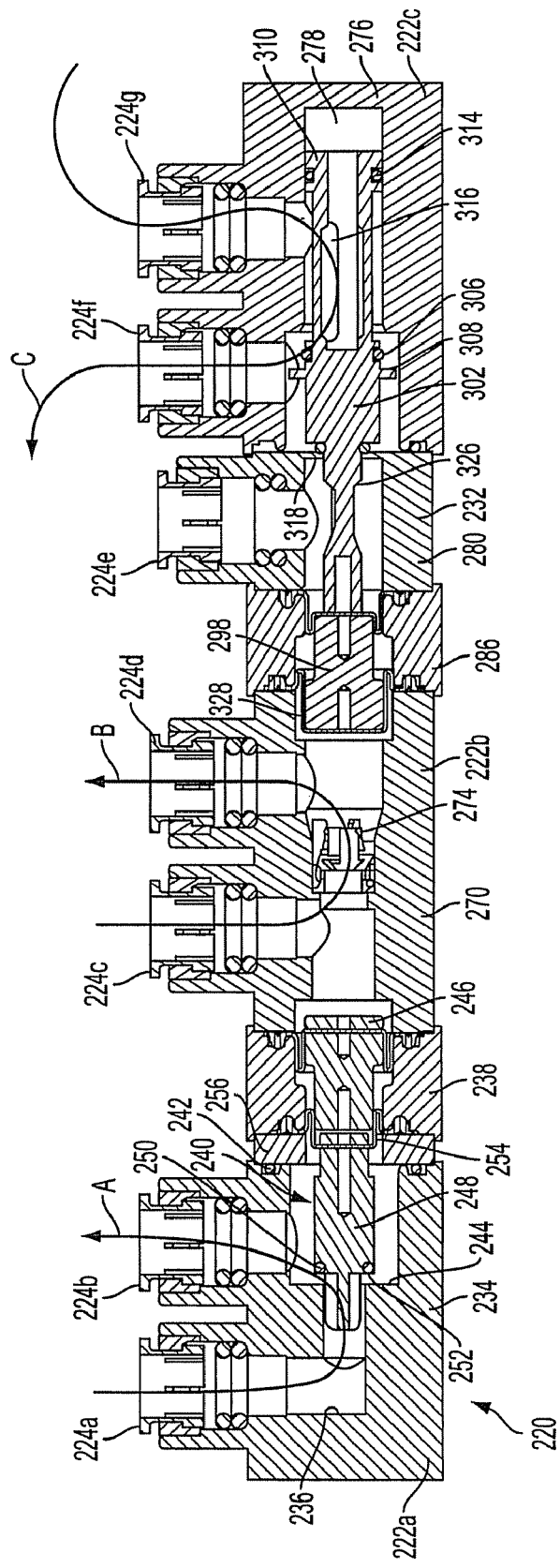
FIG. 5 is an isolated cross-sectional views of the valve assembly of FIG. 3 shown in the faucet open position.

Referring additionally to FIGS. 4 and 5, isolated cross-sectional views of the valve assembly 220 are shown in the faucet open and closed positions, respectively. The first flowpath A passes through the first sub-assembly valve 222a of the valve assembly 220 from the inlet supply water to the concentrate chamber 88 of the tank 80. When the faucet is closed, the first flowpath A is normally closed. However, when the faucet is open, the first flowpath A opens to provide the inlet supply water to the concentrate chamber 88 for helps to pressurize the permeate chamber 86 of the tank 80 and, in turn, effectively dispense permeate from the faucet 200.

Referring still to FIG. 3, when the first flowpath A is open as shown in FIG. 5, the inlet water passes through the membrane 18 to a first T-connector 226a, which provides the inlet water to port 224a on the first sub-assembly valve 222a of the valve assembly 210. The inlet water supply exits port 224b, passes through a flow restrictor 228, through a second T-connector 226b and into the concentrate chamber 88 of the tank 80 via port 224f as described in more detail below.

The second flowpath B of the valve assembly 220 passes through the second sub-assembly valve 222b from the permeate chamber 86 of the tank 80 to the faucet 200. When the faucet 200 is closed (see FIG. 6), the second flowpath B is normally closed. However, when the faucet 200 is open (see FIG. 7), the second flowpath B opens so that permeate passes from the permeate chamber 86 of the tank 80 out of the faucet 200. Ports 224c, 224d of the second sub-assembly valve 222b effectively couple the valve assembly 220 into the second flowpath B. The permeate flows from the permeate chamber 86 of the tank 80, through a third T-connector 226c and a final filter 230, and into port 224c on the second sub-assembly valve 222b of the valve assembly 220. The permeate then exits port 224d of the second sub-assembly valve 222b and passes out the faucet 200.

The third sub-assembly valve 222c completes either the third flowpath C or the fourth flowpath D. When the faucet 200 is open, the third flowpath C opens to provide inlet supply water into the concentrate chamber 88 to pressurize the permeate chamber 86 of the tank 80. The third flowpath C inlet supply water passing through the first T-connector with inlet 224g of the third sub-assembly valve 222c. The inlet supply water exits via port 224f and passes through the second T-connector 226b into the concentrate chamber 88.

When the faucet is closed, the third sub-assembly valve 222c opens the fourth flowpath D to connect the concentrate chamber 88 to drain. As a result, concentrate flows from the concentrate chamber 88, through the second T-connector into port 224f. The concentrate then exits via outlet 224e to drain relieving the tank pressure on the permeate chamber 86 so that the membrane can function with little or no back pressure.

Figure 6:
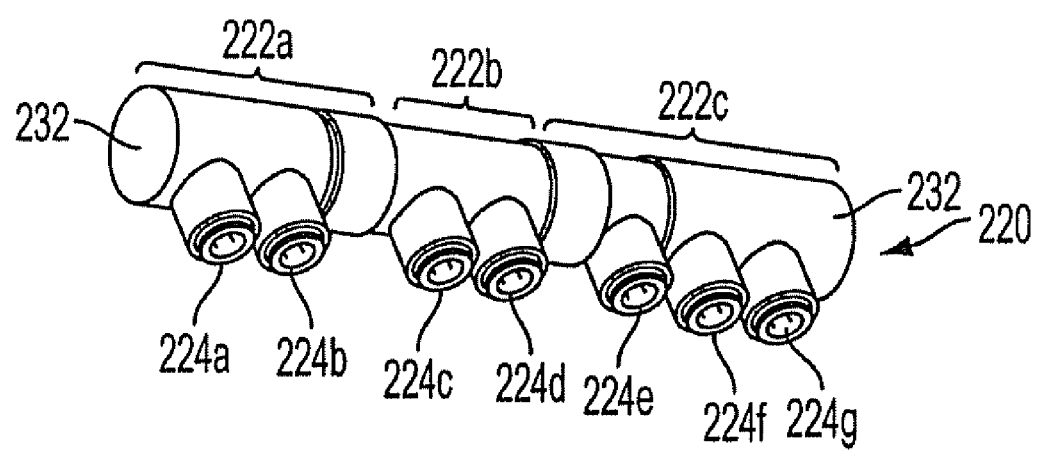
FIG. 6 is a perspective view of a valve assembly of FIG. 3.
Figure 7A:
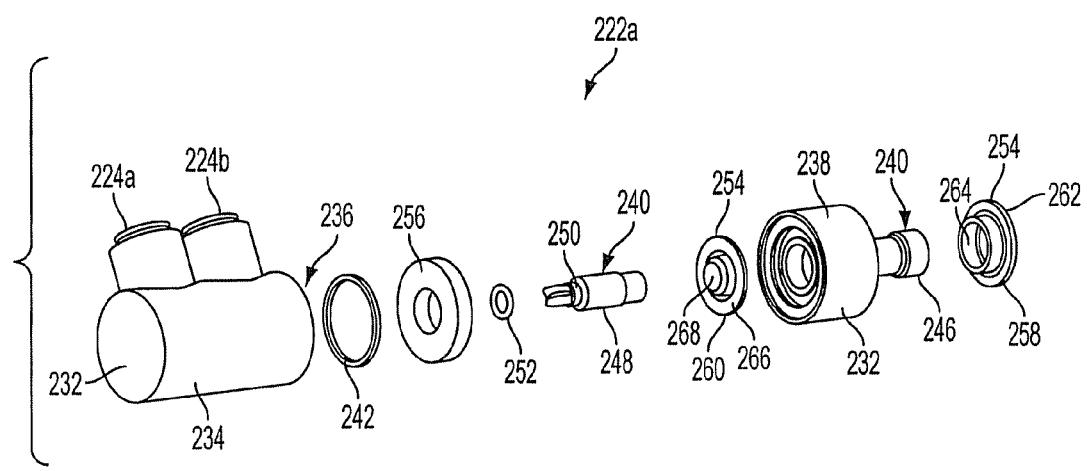
FIG. 7A is an exploded view of the two-port, end sub-assembly valve of the valve assembly of FIG. 3.
Figure 7B:
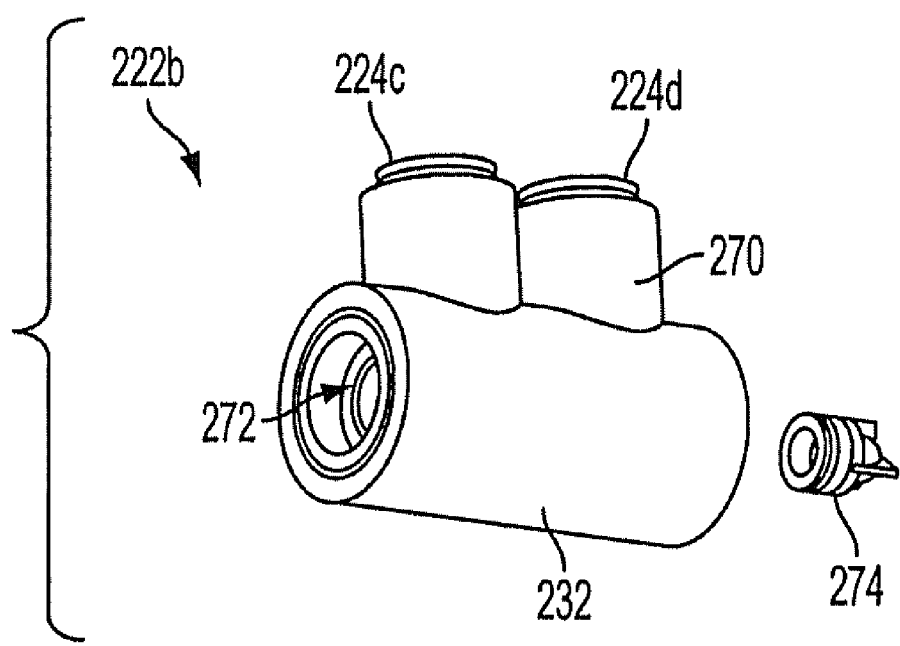
FIG. 7B is an exploded view of the centrally located check valve sub-assembly valve of the valve assembly of FIG. 3.
Figure 7C:
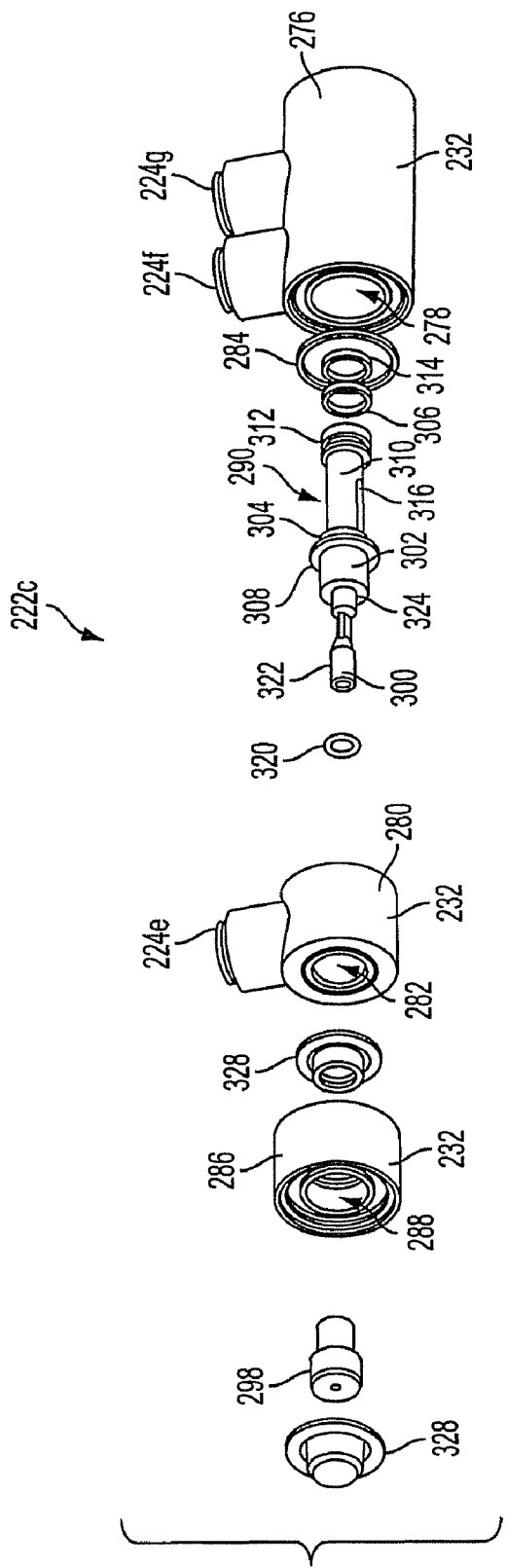
FIG. 7C is an exploded view of the three-port sub-assembly valve of the valve assembly of FIG. 3.

Referring to FIGS. 6-7C, perspective and exploded views of the valve assembly 220 are shown. The valve assembly 220 includes an outer housing 232 preferably formed from multiple components although the housing 232 may also be unitary. The housing 232 forms the ports 224a-g for coupling to the other system components. The ports 224a-g contain collets and other well-known, seals, fittings and connectors that are not described in detail for brevity. The housing 232 also defines an interior for containing the working components of the three sub-assembly valves 222a-c. For purposes of explanation, the valve assembly 220 is divided into three sub-assembly valves 222a-c although it is recognized that the divisions could be differently configured and such designation is for purposes of explanation. Indeed, there is interaction between the sub-assembly valves 222a-c.

Referring to FIG. 7A, an exploded view of the sub-assembly valve 222a is shown. The sub-assembly valve 222a includes an end housing portion 234 that partially defines an interior 236 of the sub-assembly valve 222a. The interior 236 being in fluid communication with inlet 224a and outlet 224b. The end housing portion 234 sealingly engages a housing coupling section 238, which movably retains a first piston assembly 240. An o-ring 242 provides sealing contact between the end housing portion 234 and coupling section 238.

The interior 236 of the end housing portion 234 includes an annular shoulder 244 best seen in FIGS. 3-5. The first piston assembly 240 selectively engages the annular shoulder 244 to open and close the flowpath A between the ports 224a, 224b. The piston assembly 240 includes a piston rod 246 coupled to a piston seal 248, wherein the piston seal 248 engages the annular shoulder 244. The piston seal 248 forms a step 250 that carries a seal ring 252. The seal ring 252 provides a fluid tight seal against the annular shoulder 244 in the closed position (see FIG. 4).

Still referring to FIG. 7A, a two-part rolling diaphragm 254 movably mounts the piston rod 246 of the piston assembly 240 within the housing coupling section 238. A spacer 256 helps position the piston assembly 240 within the housing coupling section 238 of the housing 232. The rolling diaphragm 254 includes two durable, flexible membranes 258, 260.

One membrane 258 has a outer seal 262 that is preferably centrally fastened to the piston rod 246 with a periphery clamped by the housing 232 between the sub-assemblies 222a, 222b. As a result, pressure within sub-assembly valve 222a can act on the rolling diaphragm 254/piston rod 246 to create the movement noted above. By clamping the membrane 258 between the sub-assemblies 222a, 222b, a fluid tight seal is also created. The membrane 258 also has a collar 264 to surround and help secure the piston rod 246 thereto.

The second membrane 260 of the rolling diaphragm 254 also has a planar disk 266 that is preferably coupled to the piston seal 248 and a surrounding collar 268 for supporting the piston seal 248. The second membrane 260 may include a central aperture in the planar disk 266 for tightly passing the piston seal 248 there through.

Referring to FIG. 7B, an exploded view of the sub-assembly valve 222b is shown. The sub-assembly valve 222b includes a central housing portion 270 that defines an interior 272 establishing fluid communication between inlet 224c and outlet 224d. The sub-assembly valve 222b includes an one-way check valve 274 intermediate the inlet 224c and outlet 224d such that tank permeate may flow from the inlet 224c to the outlet 224d but not vice versa.

Figure 8:
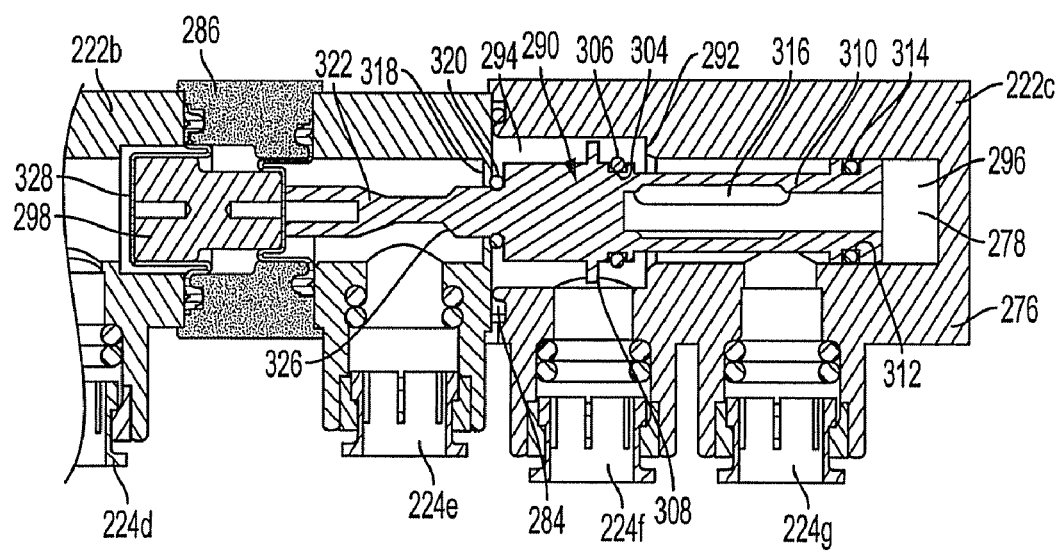
FIG. 8 is a detailed cross-sectional view of the three-port sub-assembly valve of the valve assembly of FIG. 3 in a dispensing permeate position.

Referring to FIGS. 7C and 8, an exploded view and detailed cross-sectional view of the sub-assembly valve 222c are shown, respectively. Please note that FIG. 8 is in the position with the flowpath C being open and the flowpath D being closed, i.e., a faucet 200 open position. The sub-assembly valve 222c also includes an end housing portion 276 that defines an interior 278 in fluid communication with ports 224f, 224g. The end housing portion 276 sealingly engages an intermediate port section 280, which defines port 224e in fluid communication with an interior 282. Preferably, an o-ring 284 facilitates sealing between the end housing portion 276 and the intermediate port section 280. The intermediate port section interior 282 is also in fluid communication the end housing portion's interior 278.

A second coupling section 286 attaches to the intermediate port section 280 and also defines an interior 288 in fluid communication with port 224e. The second coupling section 286 also engages the sub-assembly valve 222b (shown partially in FIG. 8).

The sub-assembly valve 222c movably retains a second piston assembly 290. The second piston assembly 290 has two positions. In one position, the flowpath C is blocked and the flowpath D is open (see FIG. 4). In the other position, the flowpath C is open and the flowpath D is blocked (see FIGS. 5 and 8).

As best seen in FIG. 8, the interior 278 of the end housing portion 276 also includes an annular shoulder 292 intermediate ports 224f, 224g. Thus, the interior 278 has a larger diameter portion 294 adjacent port 224f and a smaller diameter portion 296 adjacent port 224g. The piston assembly 290 selectively engages the annular shoulder 292 and smaller diameter portion 296 to open and close the flowpath C between the ports 224f, 224g.

The piston assembly 290 includes a piston rod 298 coupled to a long piston seal 300, wherein the long piston seal 300 extends from the smaller diameter portion 296 to the sub-assembly valve 222b. A central portion 302 of the long piston seal 300 has an annular groove 304 that retains a seal ring 306. The central portion seal ring 306 passes into the smaller diameter portion 296 to create the fluid tight seal that closes the flowpath C. In this closed position (see FIG. 4), an annular stop 308 on the central portion 302 abuts the annular shoulder 292 to set the depth that the central portion seal ring 306 extends into the smaller diameter portion 296. As can be seen, the central portion seal ring 306 is a limited sliding seal in that the seal ring 306 only travels a small distance in which contact is made with the smaller diameter portion 296. As a result, wear of the seal ring 306 is reduced.

The right end 310 of the long piston seal 300 has an annular groove 312 with an o-ring 314 therein to provide a sliding seal within the end housing portion 276. The o-ring 314 is optional. The right end 310 defines at least one slot 316 to provide a flow path for fluid into the right side chamber to provide additional surface area against which fluid pressure may move the piston assembly 290. The space 338 between the right end 310 and the very end of the end housing portion 276 fills with fluid to help generate force to move the piston assembly 290.

Still referring to FIGS. 7C and 8, the intermediate port section 280 forms a necked down passage 318 opposing the step 292 of the end housing portion 276. The piston assembly 290 selectively engages the necked down passage 318 to open and close the flowpath D (see FIG. 4) between the ports 224e, 224f. The long piston seal 300 carries another seal ring 320 to make contact with the necked down passage 318. The seal ring 320 is positioned at the juncture 324 between the central portion 302 and a left portion 322 of the piston seal 300. As such, this seal ring 320 only makes contact when the flowpath D is closed (e.g., a seal to seal contact) and, therefore, wear is minimal.

The left portion 322 of the long piston seal 300 has a tapered region 326. As the tapered region 326 of the left portion 322 passes through the necked down passage 318, a variable flow restrictor effect is created to facilitate opening and closing action as described below. The left portion 322 of the piston seal 300 also couples to the piston rod 298 and another two-part rolling diaphragm 328 within the coupling section 286. Hence the piston assembly 290 movably mounts and is supported by the rolling diaphragm 328 on one end and the right end 310 in the smaller diameter portion 296 on the other. Preferably, the two-part rolling diaphragm 328 is the same as discussed above.

In operation, the valve assembly 220 responds to pressure changes to open and close the four flowpaths A, B, C, D. Referring to FIG. 4, the valve assembly 220 is shown in a static condition with the faucet 200 closed. The first flowpath A of the valve assembly 220 is closed by a combination of factors although it may be sized and configured to actuate based upon a single factor.

One factor is the pressure from the full permeate chamber 86 within the interior 272 of sub-assembly valve 222b, which acts on the first piston assembly 240 to move the first piston assembly 240 to the left. As the concentrate chamber 88 is connected to drain, there is minimal pressure, if any, at outlet 224b. Thus, the leftward bias on the first piston assembly 240 pushes the seal into the closed position. In other words, the inlet supply water deadheads at the inlet 224a.

In the faucet 200 closed position of FIG. 4, the second flowpath B also does not have any flow, even though there is only a check valve 274, because the flow from the tank permeate chamber 86 deadheads at the closed faucet 200. As noted above, the check valve 274 prevents backflow from the faucet 200 and pressure from a full permeate chamber 86 present at inlet 224c ties into sub-assembly valve 222a to drive and/or maintain the first piston assembly 240 in the closed position.

Still referring to FIG. 4, the fourth flowpath D is established through the sub-assembly valve 222c so that concentrate from the concentrate chamber 88 flows into port 224f and out port 224e to the drain. In other words, the second piston assembly 290 is positioned to the right to seal off port 224g from port 224f and open a fluid path between port 224e and port 224f. The stop 308 of the long piston seal 300 is against the annular shoulder 292. As a result, the long piston seal 300 is partially within the smaller diameter portion 296 so that the seal ring 306 blocks the flowpath between the port 224f, 224g. As a result, the concentrate chamber 88 has little, if any pressure, and the membrane 18 can refill the permeate chamber 86 with no back pressure.

The second piston assembly 290 is moved to the right by a combination of factors. The second piston assembly 290 could be sized to move between positions based on one or more of these factors. One factor pushing the second piston assembly 290 to the right is the permeate pressure within the full permeate chamber 86. As noted above, the permeate pressure is present within the sub-assembly valve 222c and also acts on the second piston assembly 290 through the second rolling diaphragm assembly 328.

Another factor is the fourth flowpath D from the concentrate chamber 88 being open to drain. This low pressure fluid path passes through the interior 278 of sub-assembly valve 222c in the larger diameter portion 294, e.g., the left side of the second piston assembly 290. Thus, although there may be flow from the concentrate chamber 88 to drain as the permeate chamber 86 fills, the pressure within the sub-assembly valve 222c is minimal. The imbalance between increasing or high permeate pressure in sub-assembly valve 222b and decreasing concentrate or low drain pressure in sub-assembly valve 222c acts to push the second piston assembly 290 to the right.

Referring to FIG. 5, the valve assembly 220 is shown in the dispensing or faucet 200 open position. When the faucet 200 opens, the pressure drops in the interior of the sub-assembly valve 222b because the permeate begins to flow. With this pressure drop, the inlet water pressure on the first piston assembly 240 drives the first piston assembly 240 to the right. As a result, the first flowpath A opens from inlet 224a to outlet 224b and, in turn, inlet water flows into the concentrate chamber 88. The inlet water supply being fed to the concentrate chamber 88 helps expel permeate from the permeate chamber 86.

The pressure drop in the interior of the sub-assembly valve 222b also removes the associated force that was keeping the second piston assembly 290 to the left. The inlet water supply, via port 224g, fills the slots 316 in the long piston seal 300 and, thus, the second piston assembly 290 moves to the left. As the tapered region 326 enters the necked down passage 318, a flow restrictor effect occurs. The flow restrictor effects creates a build up of pressure within the interior 278 of the end housing portion 276 that assures effective engagement between the seal ring 320 and necked down passage 318.

As the second piston assembly 290 moves to the left, the third flowpath C between inlet 224g and port 224f begins to open and the fourth flowpath D between outlet 224e and port 224f begins to close. As the tapered region 326 begins to move leftward, the surface area and associated force preventing the piston assembly 290 from moving left begin to decline. Additionally, the area 338, which is expanding, and slots 316 contain pressurized fluid to move the piston assembly 290 leftward. Thus, multiple dynamic forces are acting on the piston assembly 290 to make sure movement is completed once started. The flowpath C opening and flowpath D closing creates a pressure build in the concentrate chamber 88 by closing off the path to drain and feeding inlet supply water to the concentrate chamber 88. As a result, the permeate is pressurized for dispensing from the faucet 200.

Upon closing the faucet 200, the permeate pressure rebuilds in the interior 272 of the sub-assembly valve 222b. This permeate pressure acts through the rolling diaphragms 254, 328 to start of the second piston assembly 290 to the right. The initial movement may be slow but as the tapered region 326 of the long piston seal 300 enters the necked down passage 318, the flow restriction effect dissipates. Thus, the concentration chamber 88 opens up to drain through the flowpath D. With the permeate pressure again established in the sub-assembly valve 222b and little if any pressure in the sub-assembly valve 222c, the second piston assembly 290 moves effectively to the right as shown in FIG. 4.

Once the fourth flowpath D is again open, port 224b again becomes connected to drain as well through the T-connector 226b. Although this reduces the pressure in the interior 236 of the sub-assembly valve 222a and the permeate pressure is rebuilding in the sub-assembly valve 222b, initially the first piston assembly 240 may remain in the open position so that the flowpath A remains open. This provides the benefits of allowing the membrane 18 to refill the permeate chamber 86 with no back pressure, which in turn raises the pressure within the sub-assembly valve 222b. Eventually, the permeate chamber 86 becomes full and permeate pressure at port 224c rises to force the first piston assembly 240 into the closed position.

It is noted that the subject technology would be useful in many applications. For example, the permeate could be used to supply an ice-maker or any other similar device that uses purified water. Any liquid can be effectively purified and stored for dispensing. Further, any type filter(s) may be used instead of or in addition to the combination of sediment, carbon and reverse osmosis shown, whether the filters are now known or later developed. Preferably, the filtering generates a clean flow for storage and subsequent use as well as a reject flow. Alternatively, the intake, well or municipal water could be routed to the chamber 88 via the shut-off valve 28b or directly to provide the pressurizing of the permeate storage chamber 86. This mode could even be used with the concentrate water simply routed to drain.

In view of the above, the present disclosure provides new and improved RO filtering systems. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects.

What is claimed is:

1. A reverse osmosis liquid filtering assembly comprising:
   a) an inlet supply;
   b) a reverse osmosis membrane for receiving the inlet supply and creating permeate and concentrate;
   c) a tank connected to the reverse osmosis membrane for storing the permeate in a permeate chamber and the concentrate in a concentrate chamber;
   d) a faucet for dispensing the permeate;
   e) a drain for disposal of waste; and
   f) a valve assembly including three sub-assembly valves:
   i) the first sub-assembly valve defining an inlet connected to the inlet supply and an outlet connected to the concentrate chamber;
   ii) the second sub-assembly valve defining an inlet connected to the permeate chamber and an outlet connected to the faucet; and
   iii) the third sub-assembly valve defining an outlet connected to drain, an inlet connected to the inlet supply, and a port connected to the concentrate chamber, wherein the port is selectively in fluid communication with the third sub-assembly outlet and inlet, wherein
   when the faucet is closed, the first sub-assembly valve is closed at least in part due to pressure created in the second sub-assembly valve, the second sub-assembly valve has no flow, and the third sub-assembly valve is set to open a first flowpath between the third sub-assembly port and outlet at least in part due to pressure created in the second sub-assembly valve, and
   when the faucet is open, the first sub-assembly valve is opened at least in part due to pressure dropping in the second sub-assembly valve, the second sub-assembly valve has the permeate flowing there through, and the third sub-assembly valve is set to open a second flowpath between the third sub-assembly port and the inlet at least in part due to pressure dropping in the second sub-assembly valve.

2. A reverse osmosis liquid filtering assembly as recited in claim 1, wherein upon closing the faucet after dispensing an amount of permeate, the pressure rebuilds in the second sub-assembly valve gradually such that the first sub-assembly valve remains open until the permeate chamber is substantially full.

3. A reverse osmosis liquid filtering assembly as recited in claim 1, further comprising a piston assembly within the first sub-assembly valve and a rolling diaphragm coupled to the piston assembly intermediate the first sub-assembly valve and second sub-assembly valve.

4. A reverse osmosis liquid filtering assembly as recited in claim 1, further comprising a check valve in the second sub-assembly to prevent backflow from the second sub-assembly outlet.

5. A reverse osmosis liquid filtering assembly as recited in claim 1, further comprising a piston assembly within the third sub-assembly valve.

6. A reverse osmosis liquid filtering assembly as recited in claim 5, wherein the piston assembly includes a piston seal coupled to a piston rod.

7. A reverse osmosis liquid filtering assembly as recited in claim 6, further comprising a first seal ring mounted in a first recess on an end of the piston seal such that the first seal ring only contacts a first sealing surface to selectively close the first flowpath.

8. A reverse osmosis liquid filtering assembly as recited in claim 6, further comprising a second seal ring mounted in a second recess on the piston seal such that the second seal ring only contacts a second sealing surface to selectively close the second flowpath.

9. A reverse osmosis liquid filtering assembly as recited in claim 8, further an annular stop on the piston seal to form the second recess.

10. A reverse osmosis liquid filtering assembly as recited in claim 8, wherein the second recess is an annular groove that sealingly enters a tubular channel formed by the third sub-assembly valve to close the second flowpath.

11. A reverse osmosis liquid filtering assembly as recited in claim 6, wherein the piston seal has a central tapered portion.

12. A reverse osmosis liquid filtering assembly as recited in claim 5, further comprising a rolling diaphragm coupled to the piston assembly intermediate the second sub-assembly valve and third sub-assembly valve.

13. A reverse osmosis liquid filtering assembly as recited in claim 1, wherein the permeate and concentrate chambers are operatively connected so that the concentrate in the concentrate chamber pressurizes the permeate in the permeate chamber.

14. A reverse osmosis liquid filtering assembly as recited in claim 1, further comprising a filter assembly connected before the reverse osmosis membrane.

15. A reverse osmosis liquid filtering assembly as recited in claim 1, wherein the inlet supply is pressurized water.

16. A valve assembly comprising:
- a first valve defining an inlet adapted to be connected to an inlet supply and an outlet adapted to be connected to a concentrate chamber;
- a second valve defining an inlet adapted to be connected to a permeate chamber and an outlet adapted to be connected to a faucet;
- a third valve defining an outlet adapted to be connected to drain, a port adapted to be connected to the concentrate chamber, and an inlet adapted to be connected to the inlet supply, the port being selectively in fluid communication with the third valve outlet and inlet; and
- a piston assembly in the third valve including a piston seal coupled to a piston rod, wherein the piston seal has a central tapered portion, wherein
- when the faucet opens, the first valve opens, the second valve has permeate flowing, and the third valve opens a first flowpath between the third valve port and the inlet due to pressure dropping in the second valve, and
- when the faucet closes, the first valve closes and the third valve opens a second flowpath between the third valve port and outlet due to pressure created in the second valve,
- wherein the permeate chamber and the concentrate chamber are formed in a storage tank having an outer container housing an expandable resilient bladder, an inside of the expandable bladder forming the permeate chamber, while an area outside the expandable resilient bladder and the outer container forms the concentrate chamber so that pressure generally equalizes within the storage tank and, in turn, higher pressure in the concentrate chamber urges permeate from the storage chamber and lower pressure in the concentrate chamber reduces resistance on permeate into the permeate chamber.

17. A valve assembly as recited in claim 16, wherein upon closing the faucet after dispensing an amount of permeate, pressure rebuilds in the second valve gradually such that the first valve remains open until the permeate chamber is substantially full.

18. A valve assembly as recited in claim 16, further comprising a first seal ring mounted in a first recess on an end of the piston seal such that the first seal ring only contacts a first sealing surface to selectively close the first flowpath.

19. A valve assembly as recited in claim 16, further comprising a second seal ring mounted in a second recess on the piston seal such that the second seal ring only contacts a second sealing surface to selectively close the second flowpath.

* * * * *